(12) United States Patent
Schultz et al.

(10) Patent No.: US 7,871,114 B2
(45) Date of Patent: Jan. 18, 2011

(54) ARCING SLIDE-OUT FOR VEHICLE

(75) Inventors: Timothy D. Schultz, Mishawaka, IN (US); Craig J. Reske, Niles, MI (US)

(73) Assignee: Actuant Corporation, Butler, WI (US)

( * ) Notice: Subject to any disclaimer, the term of this patent is extended or adjusted under 35 U.S.C. 154(b) by 266 days.

(21) Appl. No.: 12/108,958

(22) Filed: Apr. 24, 2008

(65) Prior Publication Data

US 2008/0284191 A1    Nov. 20, 2008

Related U.S. Application Data

(60) Provisional application No. 60/914,214, filed on Apr. 26, 2007.

(51) Int. Cl.
*B60P 3/34* (2006.01)
(52) U.S. Cl. .............. 296/26.14; 296/171; 296/172; 296/175; 296/176
(58) Field of Classification Search .......... 296/26.01, 296/26.12–26.14, 165, 171, 172, 173, 175, 296/176; 52/67, 79.5
See application file for complete search history.

(56) References Cited

U.S. PATENT DOCUMENTS

| | | | |
|---|---|---|---|
| 5,620,224 A * | 4/1997 | DiBiagio et al. ......... 296/26.13 |
| 5,758,918 A | 6/1998 | Schneider et al. |
| 5,788,306 A * | 8/1998 | DiBiagio et al. ......... 296/26.02 |
| 5,894,698 A * | 4/1999 | Dewald et al. ............. 52/67 |
| 6,293,611 B1 | 9/2001 | Schneider et al. |
| 6,402,216 B1 * | 6/2002 | McManus et al. ......... 296/26.14 |
| 6,598,354 B2 * | 7/2003 | McManus et al. ............ 52/67 |
| 6,619,714 B2 | 9/2003 | Schneider et al. |
| 6,729,669 B2 * | 5/2004 | McManus et al. ......... 296/26.13 |
| 6,976,721 B2 * | 12/2005 | Rasmussen ............... 296/26.14 |
| 7,066,517 B1 * | 6/2006 | Crean ....................... 296/26.01 |
| 7,150,482 B1 * | 12/2006 | Blodgett et al. .......... 296/26.13 |
| 7,150,483 B2 * | 12/2006 | Rasmussen ............... 296/26.14 |
| 7,178,849 B1 * | 2/2007 | Blodgett, Jr. ............. 296/26.12 |
| 7,240,938 B1 * | 7/2007 | Blodgett, Jr. ............. 296/26.01 |
| 2001/0033085 A1 * | 10/2001 | Bienert et al. ............. 296/26.01 |
| 2002/0084661 A1 * | 7/2002 | McManus et al. ........ 296/26.01 |
| 2002/0084664 A1 * | 7/2002 | McManus et al. ........ 296/26.13 |

* cited by examiner

*Primary Examiner*—Patricia L Engle
(74) *Attorney, Agent, or Firm*—Quarles & Brady LLP (57) ABSTRACT

A slide-out arcs between extended and retracted positions. An outer end of the slide-out is lifted so as to tip the slide-out inwardly when approaching the retracted position. The outer end of the slide-out is lowered so as to tip the slide-out outwardly when approaching the extended position.

3 Claims, 8 Drawing Sheets

ARCING SLIDE-OUT FOR VEHICLE

CROSS-REFERENCE TO RELATED APPLICATION

This claims the benefit of U.S. Provisional Patent Application No. 60/914,214 filed Apr. 26, 2007.

STATEMENT CONCERNING FEDERALLY SPONSORED RESEARCH OR DEVELOPMENT

Not applicable.

FIELD OF THE INVENTION

This invention relates to slide-out rooms or compartments, referred to as slide-out portions, of vehicles, most often found in recreational vehicles such as camping trailers and motor homes.

BACKGROUND OF THE INVENTION

Slide-out portions of vehicles have a flange at the inside end and a flange at the outside end with gaskets at each end that seal against either the inside surface of the stationary vehicle wall with the inside flange when the portion is extended, or against the outside surface of the stationary wall with the outside flange when the portion is retracted. The slide-out operating mechanism is usually at the bottom of the portion, so compressing the bottom gaskets is usually not a problem, but compressing the upper portions of the gaskets can be a problem, since the slide-out operating force is applied a relatively far distance from those portions. The present invention addresses this problem in an economical manner.

SUMMARY OF THE INVENTION

The present invention provides a slide-out in which the upper portions of the gaskets are compressed before the lower portions on both retraction and extension of the slide-out. The invention accomplishes this by the slide-out following an arcing path between the fully extended and fully retracted positions so that when approaching full retraction the slide-out is angled inwardly and when approaching full extension the portion is angled outwardly.

In an especially useful aspect, the portion is supported adjacent to the opening in the wall, and that support acts as a fulcrum. The slide-out operating mechanism is mounted to the frame of the vehicle so that when approaching full retraction the mechanism lifts the outside of the portion to tip it inwardly and when approaching full extension the operating mechanism moves the outer wall of the portion downwardly so as to tip it outwardly. At some point in between these positions, the room is essentially square to the stationary portion, with the room floor parallel to the stationary floor and/or the room flanges parallel to the stationary side wall of the vehicle. Preferably, the support is provided by rollers, rails are mounted to the room that are supported by the rollers and the operating mechanism has an extendable rail that is mounted to the recreational vehicle at an angle so as to lift the room upon retraction and move the room downwardly upon extension.

The operating mechanism should also have sufficient force to compress the gaskets even after the upper portions of the gaskets have been compressed against the stationary wall of the recreational vehicle so as to substantially true up the slide-out portion relative to the stationary portion of the recreational vehicle, with the floor of the slide-out generally parallel to the floor of the stationary portion and/or the flanges of the slide-out generally parallel to the stationary wall of the vehicle.

Other features and advantages of the invention will be apparent from the detailed description and drawings.

DETAILED DESCRIPTION OF THE PREFERRED EMBODIMENT

Figure 1:
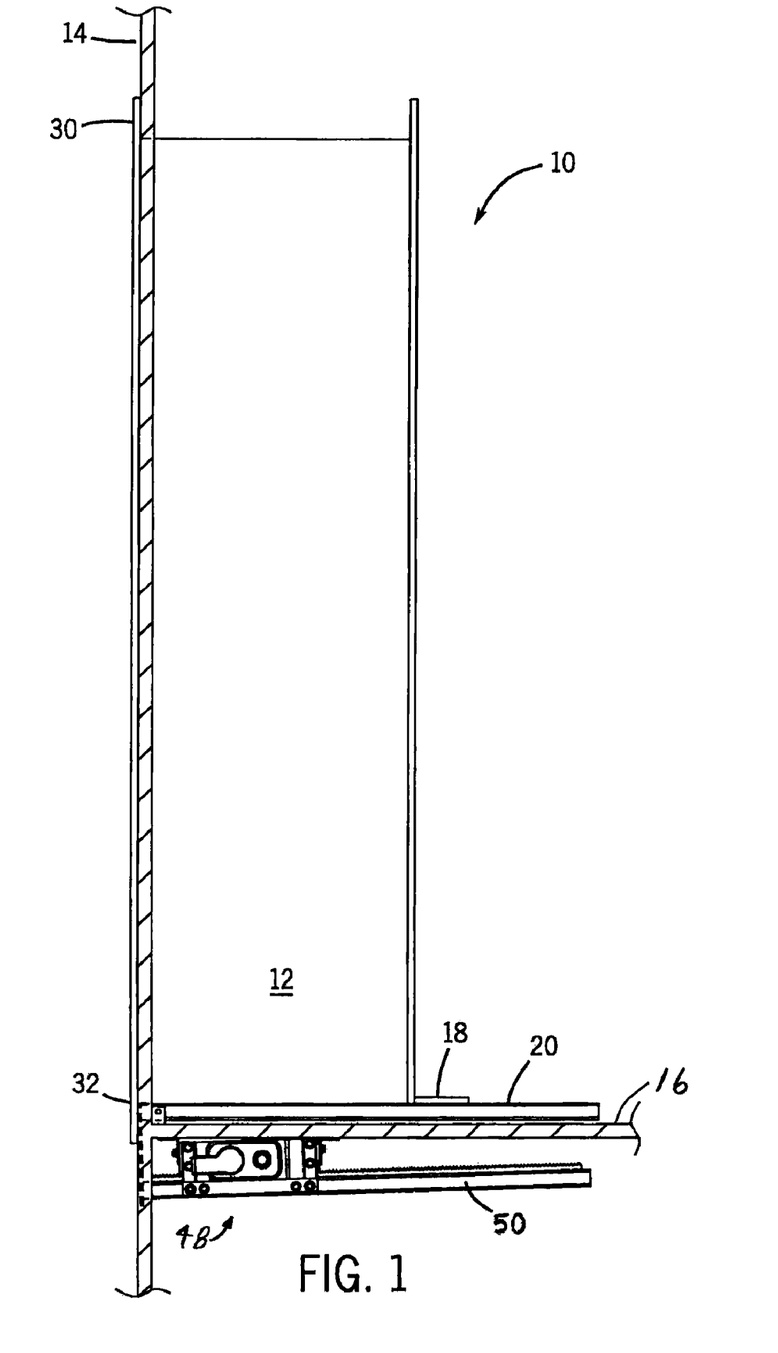
FIG. 1 is a side cross-sectional view of a slide-out fully retracted in a vehicle incorporating the invention.

Referring to FIG. 1, a vehicle 10 of the invention, which may be a recreational vehicle such as a camping trailer or motor home, has slide-out portion 12 illustrated in a fully retracted position. The slide-out portion 12 is positioned in an opening of a stationary wall 14 of the vehicle. The vehicle also includes a stationary floor 16 and the slide-out room 12 has a floor 18. One or more rails 20 are fastened to the floor 18 and ride on a roller assembly 22 having a yoke 24 that is fastened to the stationary floor 16 or frame of the vehicle. Rollers 26 of the assembly 22 roll in side channels of the rail 20 to support the room 12 near the edge of the opening and act as a fulcrum about which the room 12 can tilt in or out, as further described below. There would typically be provided one of the rails 20 and the associated roller assembly 22 on each side of the slide-out portion 12, or only one if the slide-out portion 12 is relatively narrow.

Figure 2:
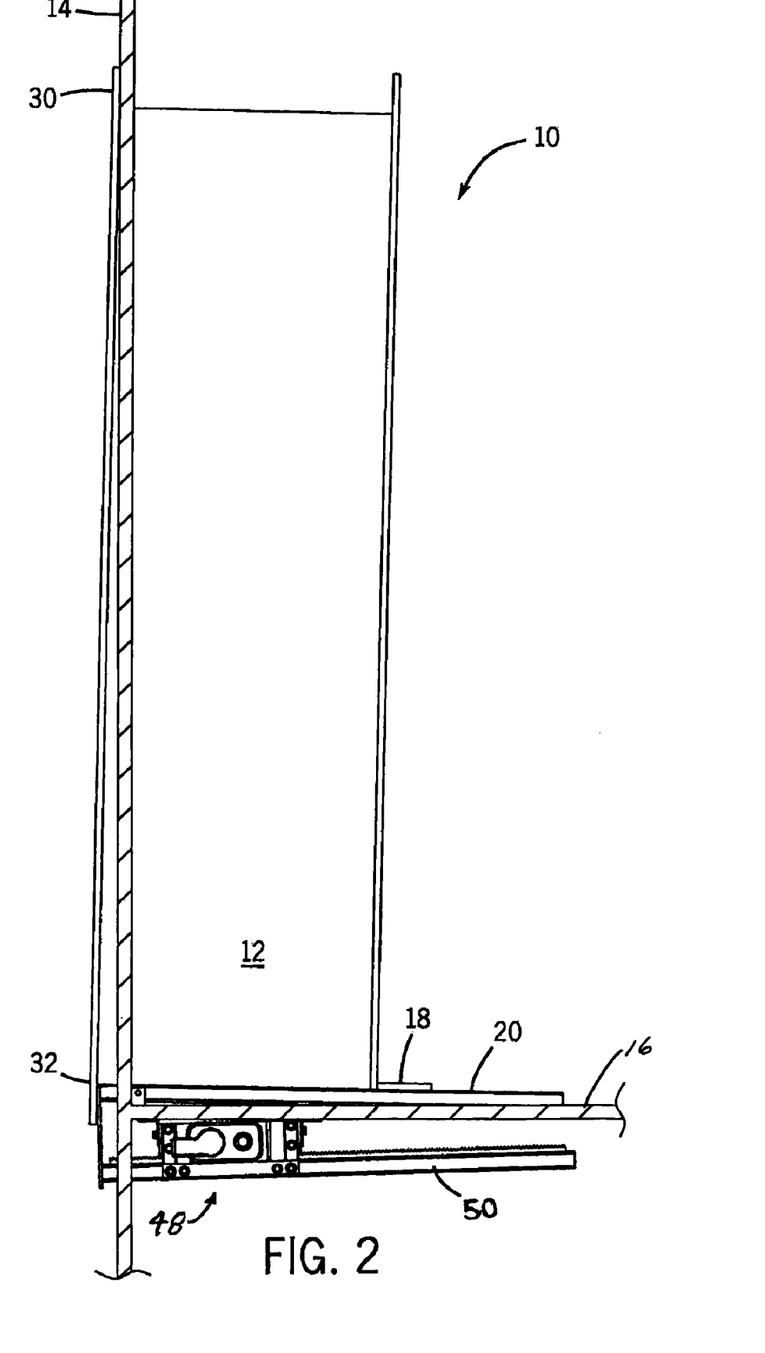
FIG. 2 is a view like FIG. 1 but illustrating the slide-out in a nearly fully retracted position.

FIG. 1 shows the slide-out portion 12 in a position in which both the upper 30 and lower 32 flanges are pulled up against the stationary wall 14 with sealing gaskets compressed against the wall 14 all of the way around the slideout, and the floor 18 of the slideout portion 12 generally parallel with the stationary floor 22. In this position, as illustrated, the flanges of the room 12 are parallel to the wall 14. FIG. 2 shows the slide-out portion 10 in a position in which it is nearly retracted, with the bottom 32 pushed out a little but the top 30 still up against the wall 14. In FIG. 2, the room 12 is tilted inwardly, as can be seen in that the upper flange 30 on the outside of the room 12 is against the outer surface of the wall 14 and the lower portion of the flange at 32 is shown spaced slightly away from the outer surface of the wall 14. Thus, the gaskets which are provided between the upper portion 30 are being compressed and the lower gaskets are not. In this position, the outer end of the room 12 is higher than the inner end of the room 12.

When the room is being retracted, the top gaskets are compressed first, before the gaskets that are toward the lower portion 32. This contributes to a greater force compressing the gaskets toward the top than would otherwise be the case. However, to true up the room 12 when it is being retracted, the operating mechanism would generally be operated to fully retract the room 12 as illustrated in FIG. 1, so that the floor of the room 12 would be parallel with the stationary floor 16 and the lower portion of the flanges 32 would also be against the outer surface of the wall 14, with the gasket (not shown) in between, just like the upper portion 30 is.

Figure 3:
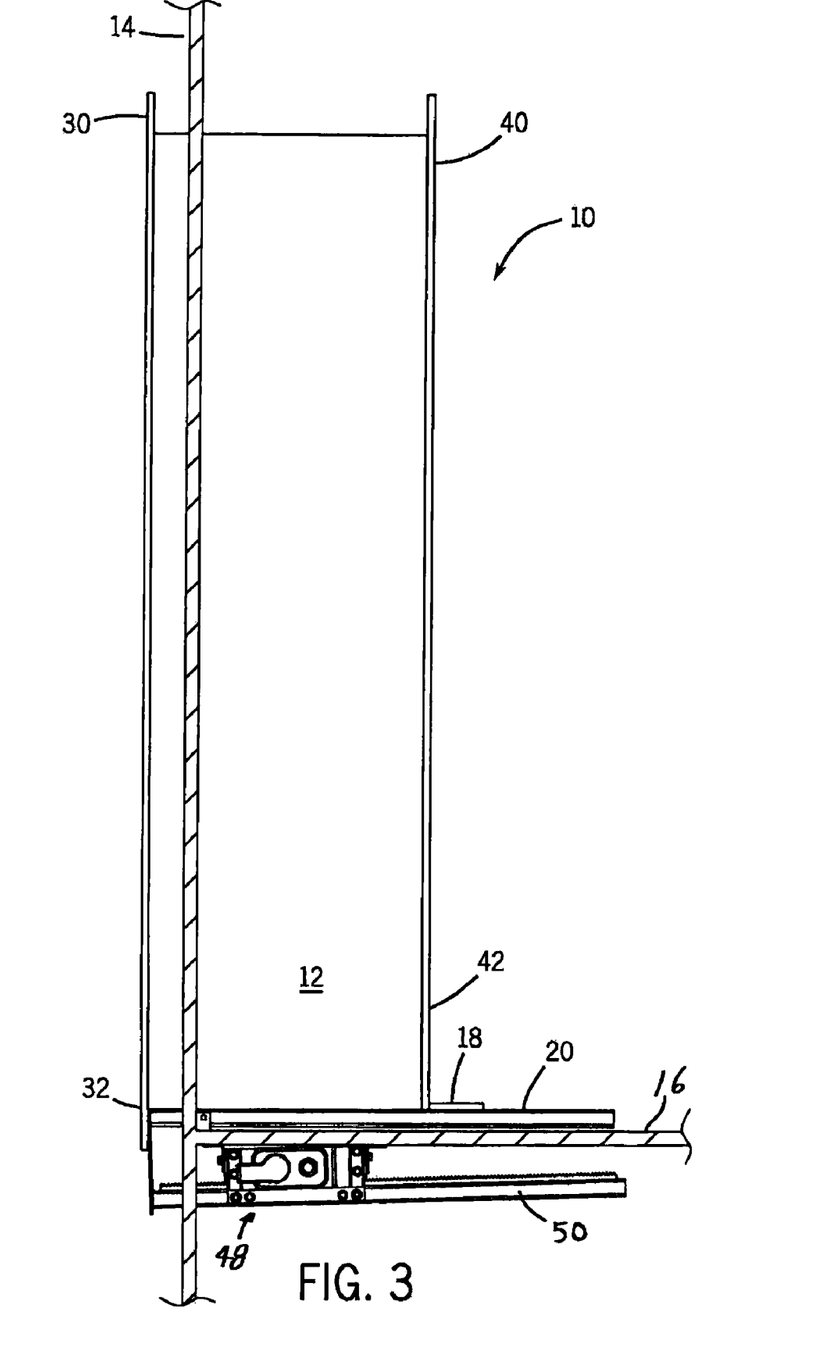
FIG. 3 is a similar view, but showing the slide-out in an intermediate position between nearly fully retracted and nearly fully extended.

FIG. 3 illustrates the room 12 having been extended to an intermediate position in which the slide-out floor 18 and the rail or rails 20 are parallel to the stationary floor 16. In this position, the outer end of the room has been lowered from the position shown in FIG. 2, such that the floor 18 is in a parallel position relative to the floor 16. Further extension results in further lowering of the outer end of the room, as described below.

Figure 4:
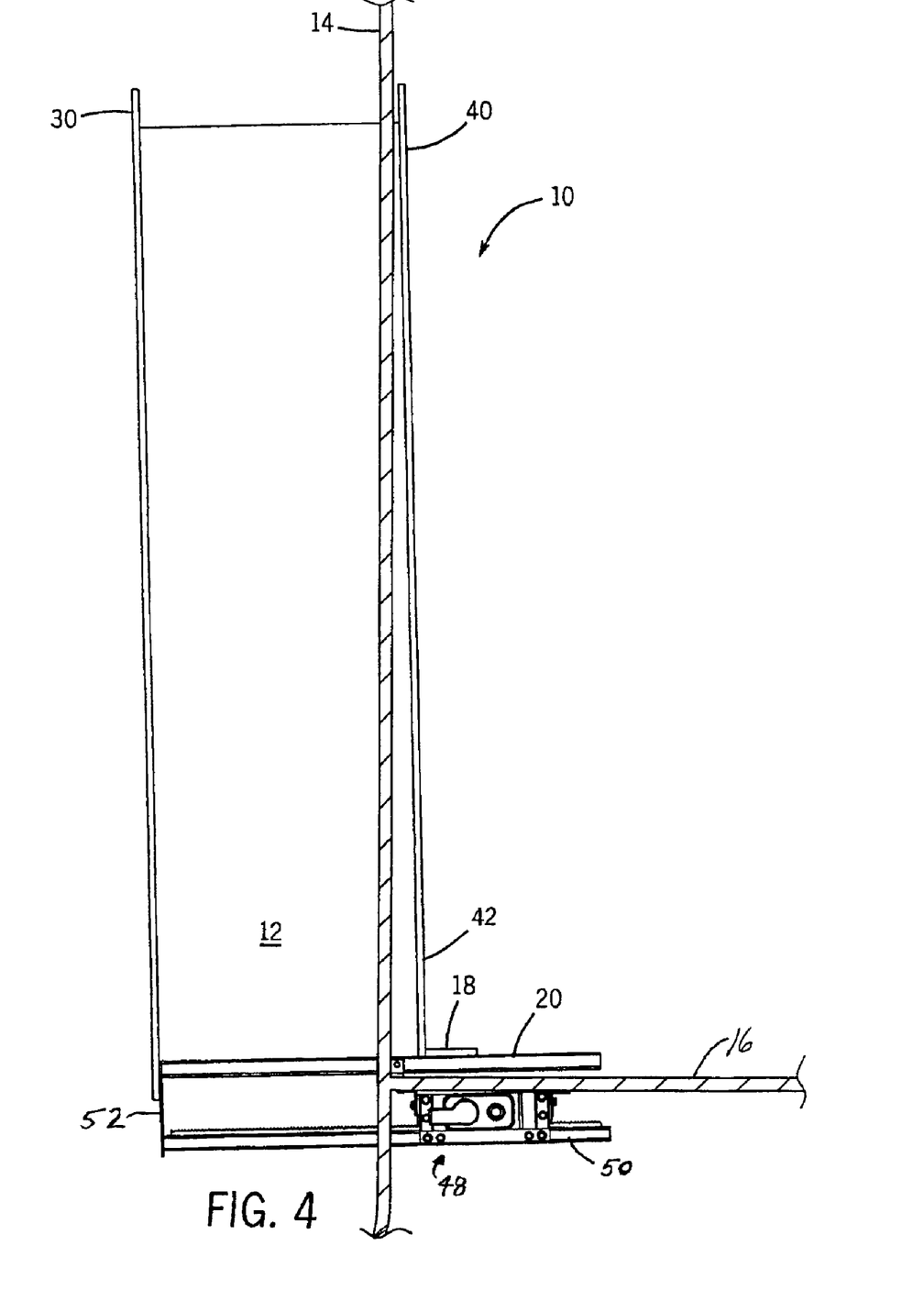
FIG. 4 is a similar view illustrating the slide-out nearly fully extended.
Figure 5:
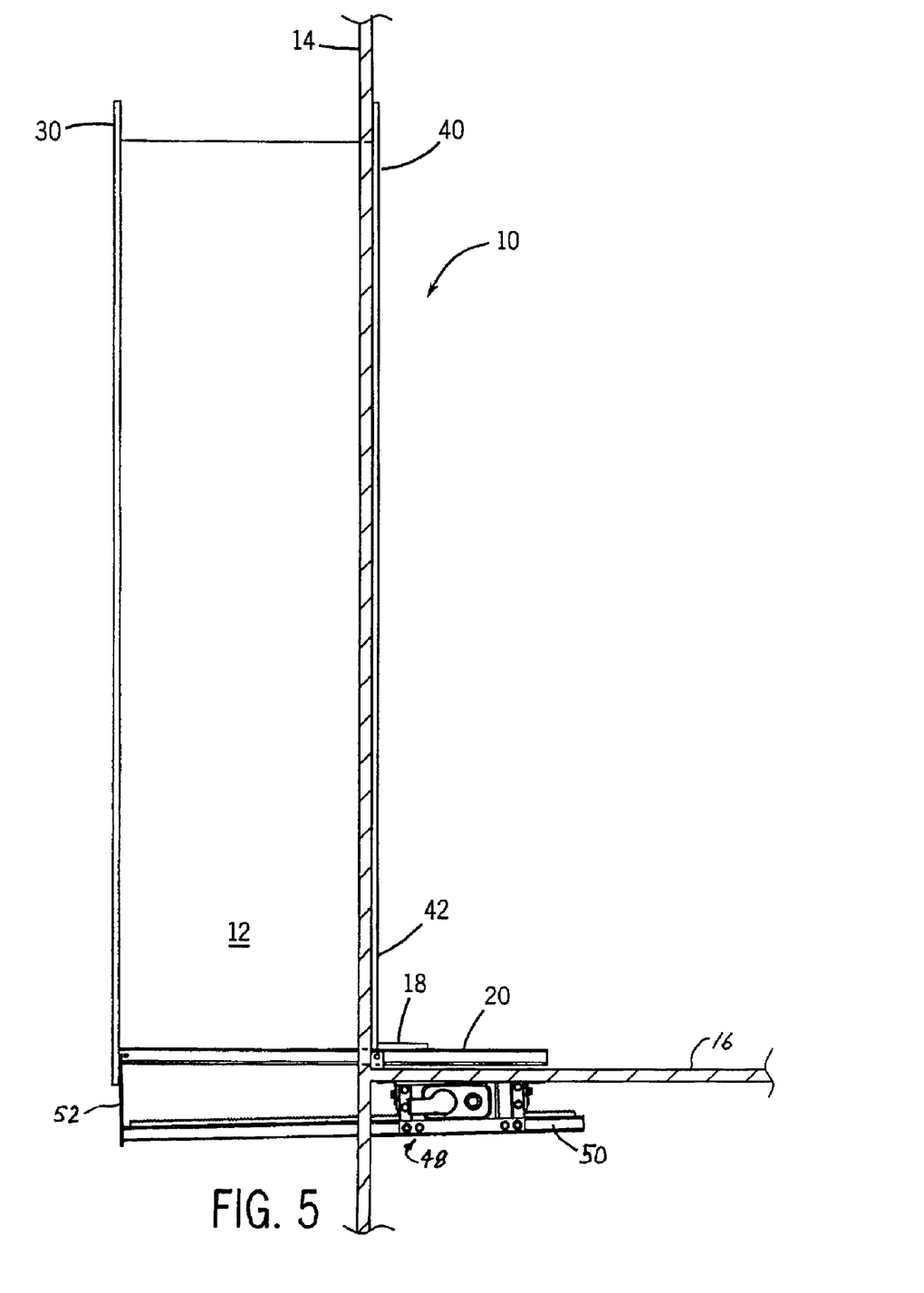
FIG. 5 is a similar view illustrating the slide-out fully extended.
Figure 6:
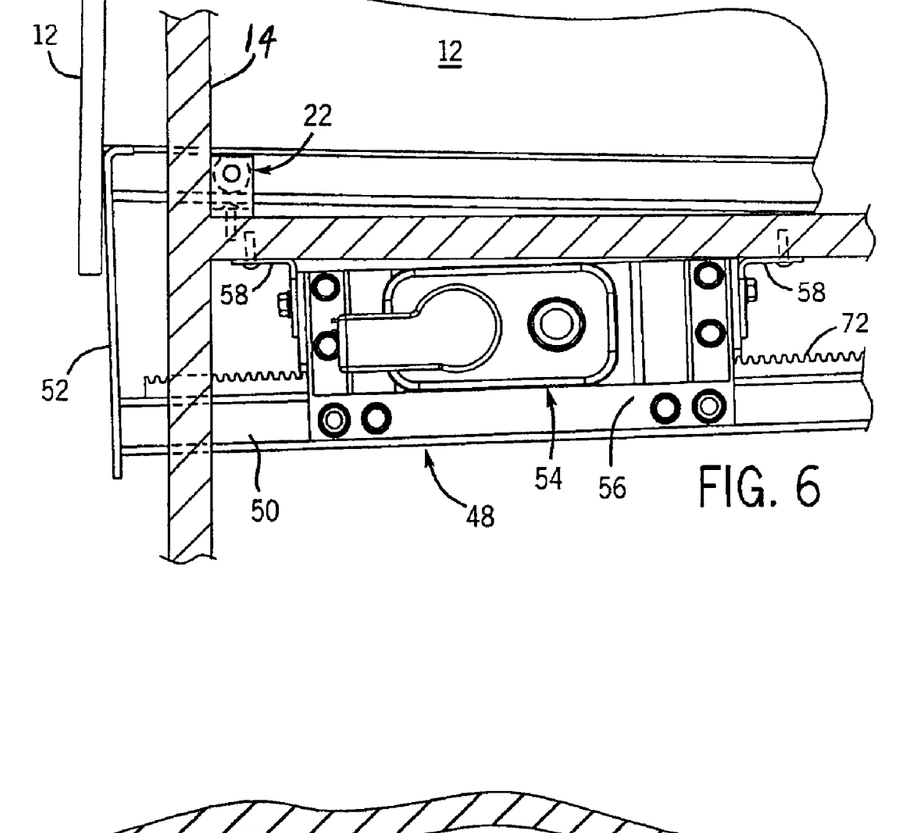
FIG. 6 is a detail view of the lower portion of FIG. 2.
Figure 7:
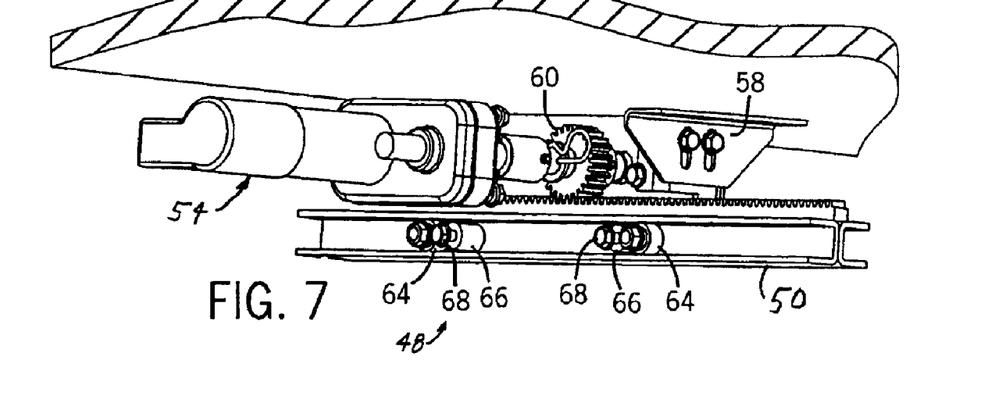
FIG. 7 is a perspective view of the operating mechanism with frame portions removed to reveal operating components of the mechanism.
Figure 8:
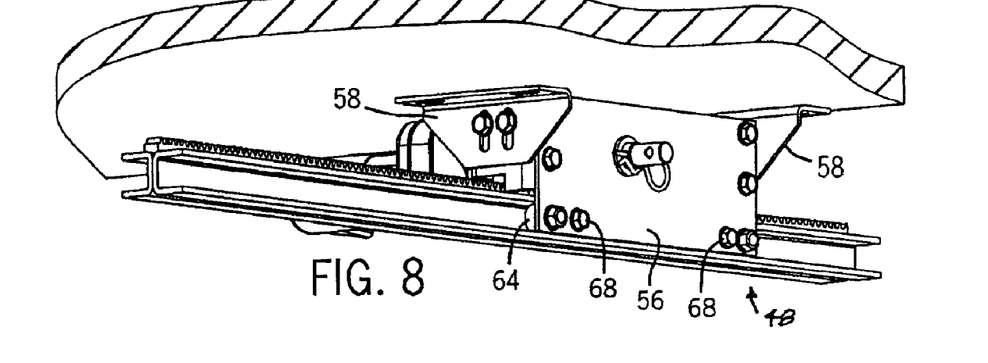
FIG. 8 is a perspective view of the operating mechanism from the side opposite to the side shown in FIGS. 6 and 7.
Figure 9:
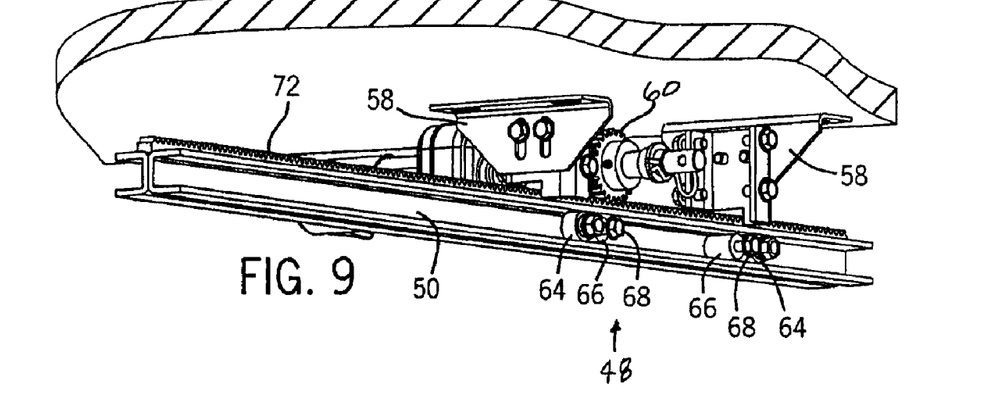
FIG. 9 is a view like FIG. 8 but with plate 56 of the frame removed to reveal operating components of the mechanism.

If the room 12 is continued to be extended beyond the point illustrated in FIG. 2, then the room 12 starts being tipped outwardly, as it is in FIG. 4, in which position the room 12 is shown nearly fully extended. As shown in FIG. 4, when nearly fully extended, the room 12 is tipped outwardly so that its outward end is lower than its inward end, and is below the point at which the support rollers support the room. When retracted as in FIG. 2, the outward end is above where the rollers 26 support the room, and in the parallel position of FIG. 3, the outward end is at the level of the rollers. In the position of FIG. 4, which is the nearly fully extended position, the upper flange 40 at the inner end of the room is closer to the inner surface of the wall 14 than is the lower flange 42, which is spaced slightly inward from the inner surface of the wall 14. Thus, when nearly fully extended, the gaskets between the upper flange 40 and the wall 14 are compressed before the gaskets between the flange 42 and the wall 14 are. Preferably, the operating mechanism 48 continues to extend the room past the position shown in FIG. 3 until the upper 40 and lower 42 flanges are both against the inner surface of the wall 14 and the room 12 is trued up relative to the stationary portion of the vehicle, with the flanges of the room parallel to the wall 14 of the stationary portion.

Any suitable mechanism may be used for extending and retracting the room 12, but the mechanism must be installed so that it lifts the room above the fulcrum provided by the rollers 26 when the room is approaching full retraction, and that it pulls the outside of the room down when the room is approaching full extension. In addition, the mechanism must permit the room to be trued up, so that it is square relative to the stationary portion of the vehicle, when the operating mechanism continues past the points shown in FIGS. 2 and 4. One such operating mechanism is illustrated in more detail in FIGS. 6-9. This is a rack and pinion type mechanism, that drives a rail 50 that has its outer end connected with a bracket 52 to the outer end of the room 12. Bracket 52 is bolted to the room 12 and is fixed to the end of the rail 50 by and suitable means, such as welding or bolting. Bracket 52 preferably has a flange at its top end that has holes in it through which the flange is bolted to the floor of the room. The corner between the top flange of the bracket 52 and the vertically extending portion of the bracket 52 permits the bracket to flex somewhat as the room is being driven in and out, as is desirable for the operation of the mechanism.

The operating mechanism 48 is installed to the vehicle with the rail 50 angled outwardly and downwardly so that as the room 12 is extended, the room 12 is moved downwardly at its outer side so as to tip the room outwardly about the fulcrum provided by rollers 26. There may be only one operating mechanism 48 provided, depending upon the width of the room 12, so a typical arrangement would be one operating mechanism 48 between two roller assemblies 22, with one rail 20 engaged with each roller assembly 22.

The operating mechanism 48 has a motor gear box unit 54 attached to a side plate 56 which is attached to end brackets 58 that are fixed to the frame of the vehicle. Motor gear box unit 54 drives a pinion 60 that is fixed to a shaft that is journaled in the plates 56 on opposite sides of the unit 48 and driven by the motor gear box unit 54, either in the extend or retract direction. The plates 56 mount rollers 64 that roll on opposite sides of the rail 50 in channels formed therein, and the plates 56 also mount wear pads 66 on the ends of bolts 68 that are threaded into the plates 56 and adjustable so as to adjust the side to side play of the rail 50 by bearing against the vertical web of the rail 50. The pinion 60 is in engagement with a rack 72 that is welded or otherwise affixed to the top of the rail 50.

The bracket 52 may be attached to the room by any suitable means. It is noted that upon extension or retraction, when the upper flange first contacts the stationary vehicle wall, and the operating mechanism is continued to be extended, the structure including the operating mechanism will have to "give" or flex sufficiently to permit the room to true up. The operating mechanism must be able to exert sufficient force for this to occur, considering the stiffness and tolerances of all of the components, and in the construction as illustrated, the force of the operating mechanism and the amount of flex in the operating mechanism 48, bracket 52, slide-out 12 and wall 14 is sufficient to true up the slide-out 12 with the wall 14. This preloads the gaskets on top and bottom of the slide-out 12, which helps to maintain a tight seal against the stationary wall 14.

Figure 10:
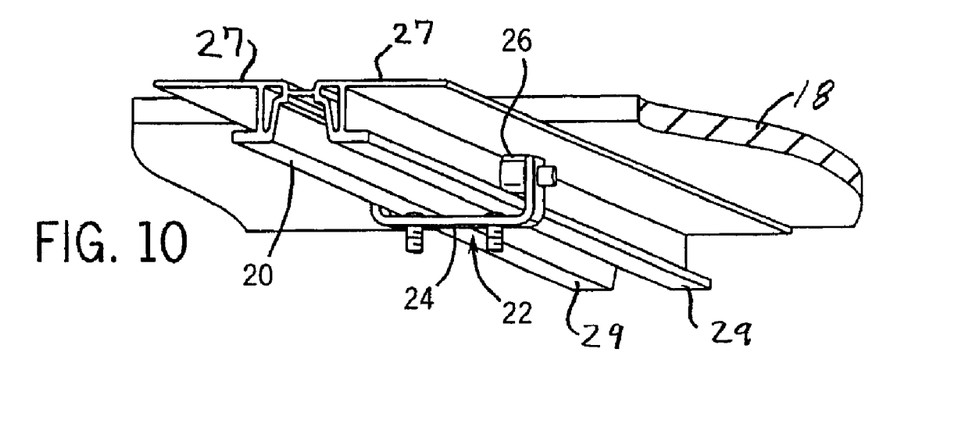
FIG. 10 is a perspective view of one of the rails and roller assemblies that support the slideout.
Figure 11:
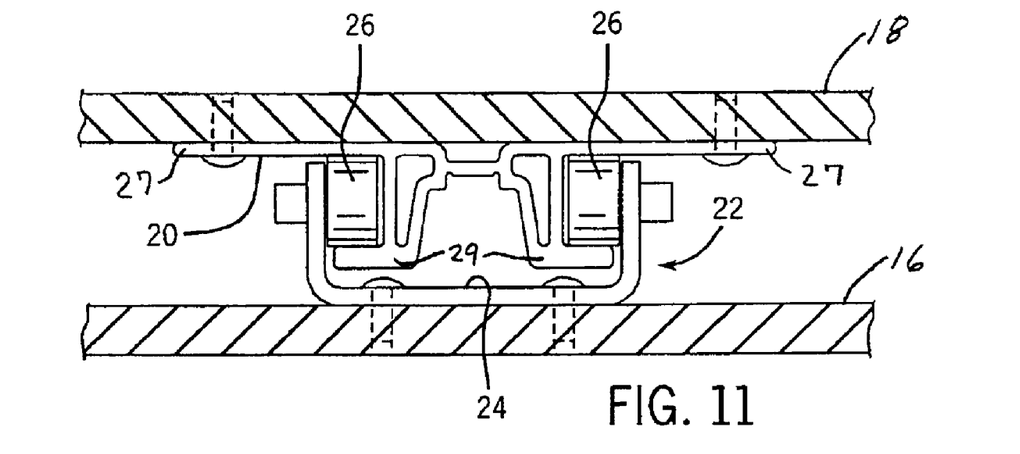
FIG. 11 is an end view of FIG. 10, also illustrating the stationary floor.

Referring to FIGS. 10 and 11, each rail 20, which may be an extruded aluminum part, defines channels on opposite sides in which the respective rollers 26 roll. The rail 20 has top flanges 27 that are bolted to the floor 18 of the slide-out portion 12. The top flanges 27 extend laterally beyond the bottom flanges 29 for this purpose. The channels in which the rollers 26 are received are defined between the top 27 and bottom 29 flanges.

A preferred embodiment of the invention has been described in considerable detail. Many modifications and variations to the preferred embodiment described will be apparent to a person of ordinary skill in the art. Therefore, the invention should not be limited to the embodiment described but should be defined by the claims which follow.

We claim:

1. A slide-out for a vehicle, the slide-out comprising:
   a slide-out portion being extendable and retractable in an opening of a stationary portion of the vehicle so as to vary a size of an interior space of the vehicle;
   a support disposed at the opening of the stationary portion, the support including:
      a plurality of rollers rotatably supported by a floor of the stationary portion of the vehicle, the plurality of rollers providing a fulcrum about which the slide-out portion tips;
      a rail connected to a floor of the slide-out portion, the rail being straight over its length and parallel to the floor of the slide-out portion, and the plurality of rollers moving within the rail as the slide-out portion moves;
   an operating mechanism, including:

a motor unit operable to extend and retract the slide-out portion;

a drive rail operatively connected between the motor unit and an outer end of the slide-out portion, the drive rail being straight over its length and disposed at angle relative to the floor of the stationary portion of the vehicle such that the drive rail moves the outer end of the slide-out portion downwardly to tip the slide-out portion outwardly about the fulcrum as the motor unit extends the slide-out portion, and such that the drive rail moves the outer end of the slide-out portion upwardly to tip the slide-out portion inwardly about the fulcrum as the motor unit retracts the slide-out portion.

2. A slide-out as in claim 1, wherein the operating mechanism further includes:

a pinion operatively connected to the motor unit; and a rack supported by the rail and driven by the pinion.

3. A slide-out as in claim 1, wherein the operating mechanism is disposed below the floor of the stationary portion of the vehicle.

* * * * *